(12) United States Patent
Watkins

(10) Patent No.: US 6,231,017 B1
(45) Date of Patent: May 15, 2001

(54) MOUNT BAR FOR VIDEO RECORDING AND DISPLAY DEVICES

(76) Inventor: D. Scott Watkins, 4075-A Nine McFarland Dr., Alpharetta, GA (US) 30004-3389

( * ) Notice: Subject to any disclaimer, the term of this patent is extended or adjusted under 35 U.S.C. 154(b) by 0 days.

(21) Appl. No.: 09/251,291

(22) Filed: Feb. 16, 1999

(51) Int. Cl.[7] ....................................................... E04G 3/00
(52) U.S. Cl. ................................... 248/274.1; 248/187.1; 248/298.1; 224/564; 224/908
(58) Field of Search ............................. 248/187.1, 183.2, 248/274.1, 276.1, 298.1, 555, 237; 224/275, 929, 554, 555, 564, 908, 539, 2

(56) References Cited

U.S. PATENT DOCUMENTS

| | | | |
|---|---|---|---|
| 2,673,056 | * | 3/1954 | Manetti ................................. 248/311 |
| 4,383,626 | * | 5/1983 | Weinblatt ............................. 234/275 |
| 4,466,659 | * | 8/1984 | Carpentier et al. ................... 297/191 |
| 5,397,160 | * | 3/1995 | Landry ................................. 296/37.8 |
| 5,421,551 | * | 6/1995 | LeClaire .............................. 248/257 |
| 5,678,741 | * | 10/1997 | Schieber ............................. 224/275 |
| 5,785,222 | * | 7/1998 | Basso et al. ........................ 234/555 |
| 5,941,600 | * | 8/1999 | Mar et al. ......................... 297/250.1 |

\* cited by examiner

Primary Examiner—Leslie A. Braun
Assistant Examiner—Walter Landry
(74) Attorney, Agent, or Firm—Baker, Donelson, Bearman & Caldwell

(57) ABSTRACT

A mount bar for supporting video equipment in a motor vehicle in which an elongated bracket supports a pivotally mounted camera and a video image display in a frame selectively attached to the mount bar, with the opposing ends of the mount bar for being attached to headrest supports in a seat of the motor vehicle. Alternate embodiments of the mount bar are disclosed.

18 Claims, 4 Drawing Sheets

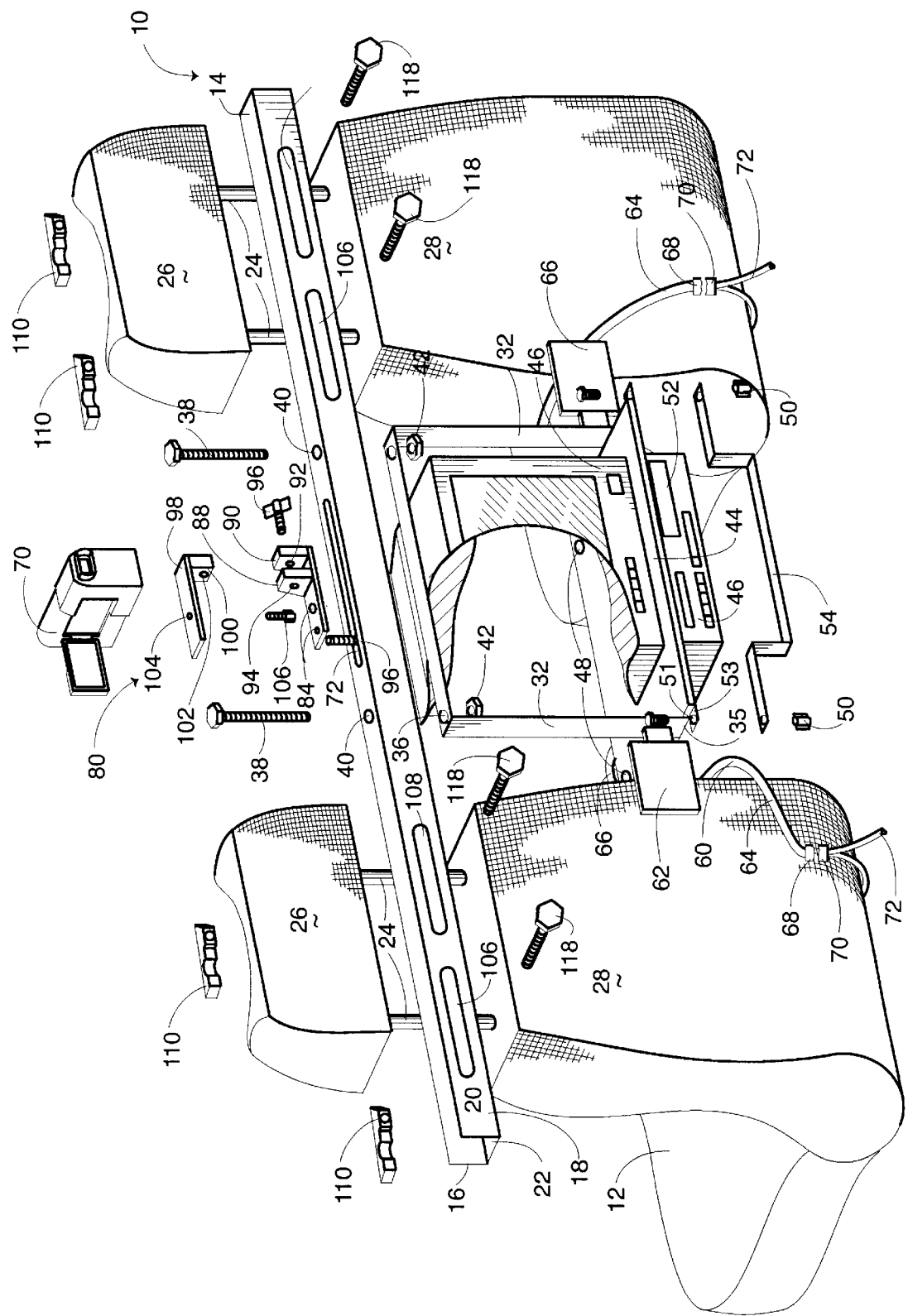

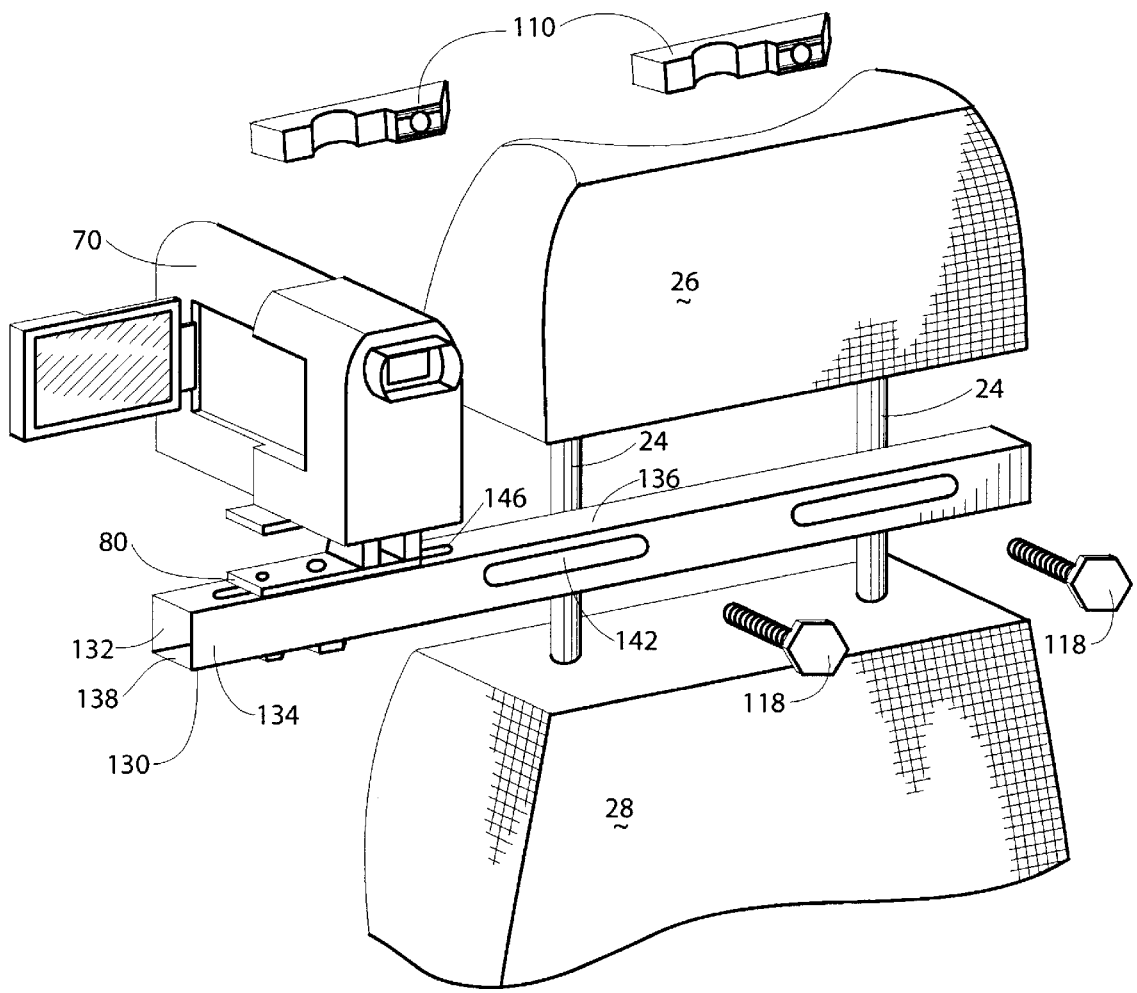
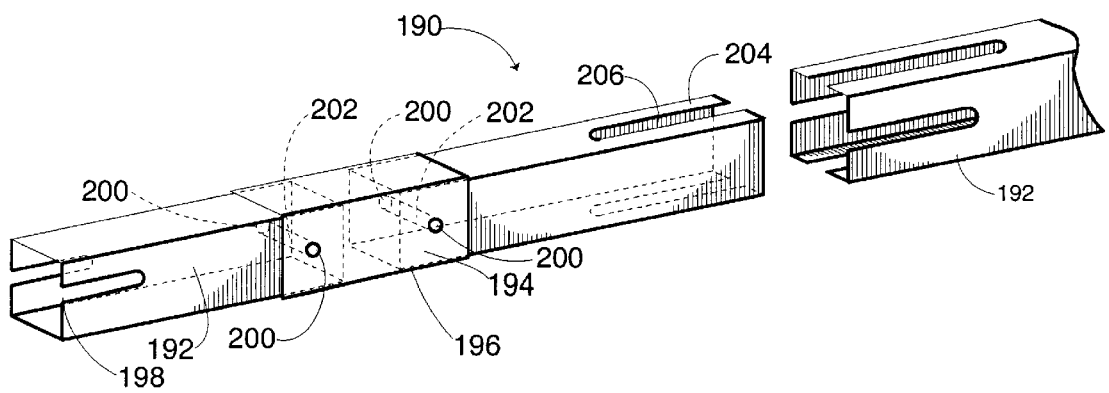

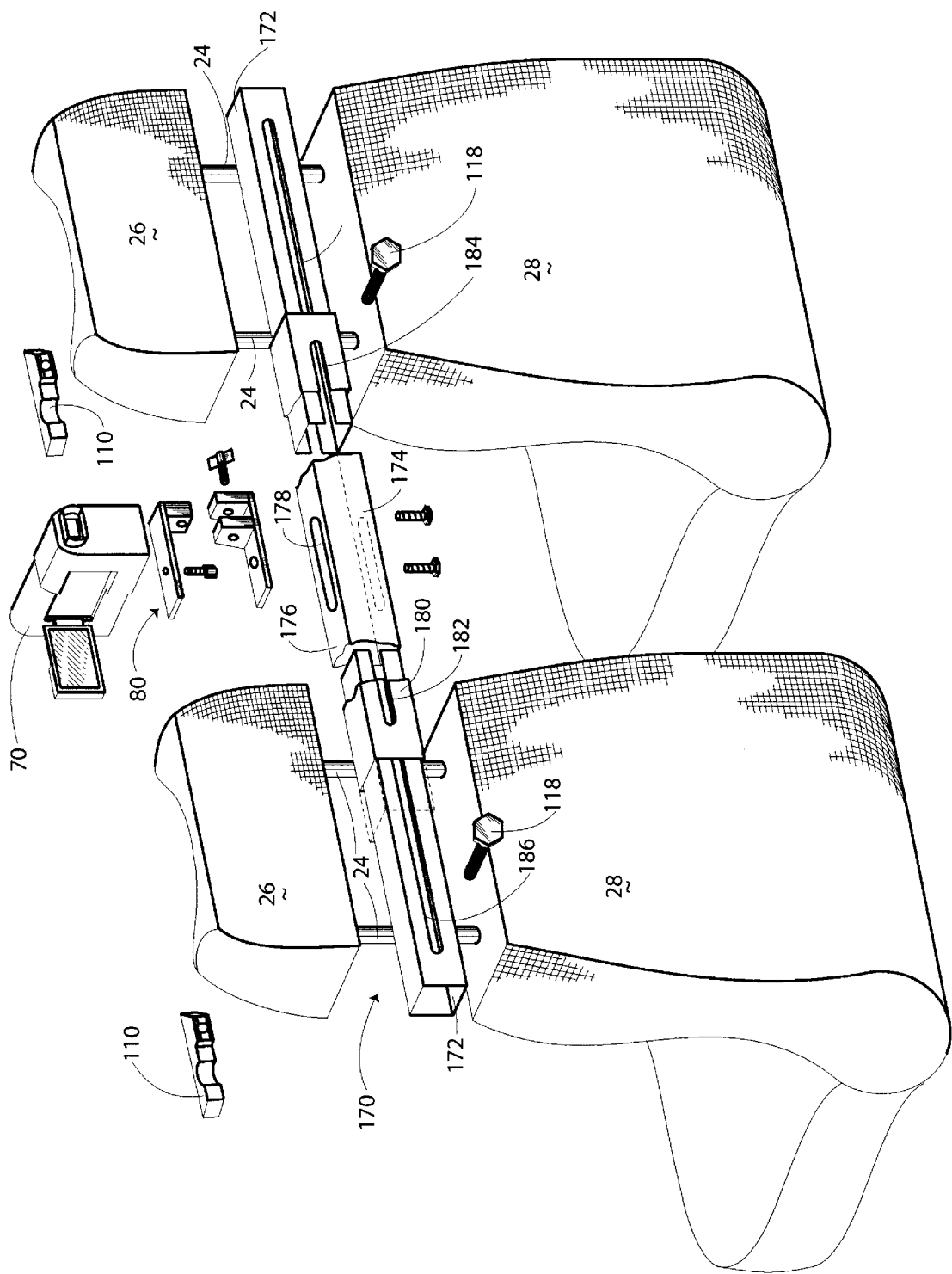

MOUNT BAR FOR VIDEO RECORDING AND DISPLAY DEVICES

TECHNICAL FIELD

The present invention relates to mount bars for video recording and display devices. More particularly, the present invention relates to a mount bar that attaches to seats in motor vehicles for supporting video recording and display devices for use therein.

BACKGROUND OF THE INVENTION

Movie cameras, and most recently, video tape cameras and recorders, have facilitated the recording and display of action through movies and television. In order to record action scenes, cameras have been mounted on a variety of devices. These devices include stationery mounts for recording movement of objects passing before the camera, as well as mounts which are positioned in moving objects. The ability to position a camera in a variety of locations permits a film director to record a number of different view points from which to observe the action. My U.S. Pat. No. 5,833,101 discloses a mount bar for supporting a video camera from a motor vehicle for recording images from the motor vehicle. However, storage and handling of the disclosed mount bar may be impractical for some motor vehicles, and may be bulky to carry.

For recording images received by the video camera, a video tape recorder is held in the motor vehicle. Video tape recorders typically mount in the trunks of motor vehicles. Trunk mounting may be satisfactory in some instances, but generally this is impractical. The recording device requires remote control devices for operation of the recorder. Tapes can not be readily checked or replaced. The recorder occupies space that may be required for other goods. However, merely placing the recorder on the floorboard of the motor vehicle is not practical either. The recorder blocks the floor space for the comfortably positioning of feet, and can readily slide around. This may damage tapes being used in the recorder or cause other problems for persons in the motor vehicle.

Also, the use of motor vehicles, particularly automobiles, is a common way for families to make long distance travel trips. Entertaining children, and even adults, during such trips often requires special efforts. Often the travelers read, listen to music or the radio, talk, sightsee, in order to pass the time. Watching video recordings during trips however is becoming more prevalent, particularly with the development of small televisions with video recording players that are operable on 12 volt supply provided by the automobile. Devices have been lacking for adequately securing these televisions for safe travel. Custom vans for instance provide special housings that attach to the floor of the van. Others mount video screens in the backs of seats. For conventional automobiles, these are not entirely satisfactory. Permanent special housings are not practical and further do not permit selective installation for long trips and removal for in-town travels.

Accordingly, there is a need in the art for an improved mount bar which rigidly secures to seats of motor vehicles for use in supporting video equipment for receiving, displaying, and recording images of objects from the motor vehicle. It is to such that the present invention is directed.

SUMMARY OF THE INVENTION

The present invention meets the needs in the art by providing improved mount bars which rigidly secure to seats of motor vehicles for use in supporting video equipment for receiving, displaying, and recording images of objects from the motor vehicle. The mount bar comprises an elongate member for being attached to a seatback of a motor vehicle. The mount bar defines a support surface to which an image receiving device is pivotally mounted, whereby the image receiving device can be selectively tilted for adjusting the angle of the view for receiving images. The opposing end portions of the elongate member are adapted for connecting to respective seatbacks of the motor vehicle in which the mount bar is installed. A frame for supporting an image display device is detachably connected to the elongate member. The frame comprises a pair of side supports adapted for attaching at respective first ends to the elongate member. A shelf attaches to respective second ends of the side supports for receiving the image display device that is secured to the shelf. A pair of opposing arms extend laterally from the pair of side supports for bearing against a back surface of a respective seat in a motor vehicle, for preventing sway of the frame during operation of the motor vehicle. Means are provided for securing a distal end of the frame to the seat of the motor vehicle.

Alternate embodiments of the mount bar are disclosed, including a mount bar for supporting a video camera laterally of a headrest, a mount bar that comprises a pair of elongate members rigidly connected together, a mount bar with telescopically received members, and a mount bar with members that pivot from first positions for storage and handling to second positions for use in supporting video equipment in motor vehicles.

Objects, advantages and features of the present invention will become apparent from a reading of the following detailed description of the invention and claims in view of the appended drawings.

BRIEF DESCRIPTION OF THE DRAWINGS

FIG. 1 is a perspective view of a mount bar attached to a seat in an motor vehicle for supporting video recording and display devices according to the present invention.

FIG. 2 is a perspective view of a camera mount bar attached to the headrest support of a seat in a motor vehicle.

FIG. 4 is a perspective view of an alternate embodiment of a mount bar attached to the headrest support of a seat in a motor vehicle.

FIG. 5 is a perspective view of an alternate embodiment of a mount bar attached to the headrest support of a seat in a motor vehicle.

DETAILED DESCRIPTION OF THE PREFERRED EMBODIMENTS

Figure 3:
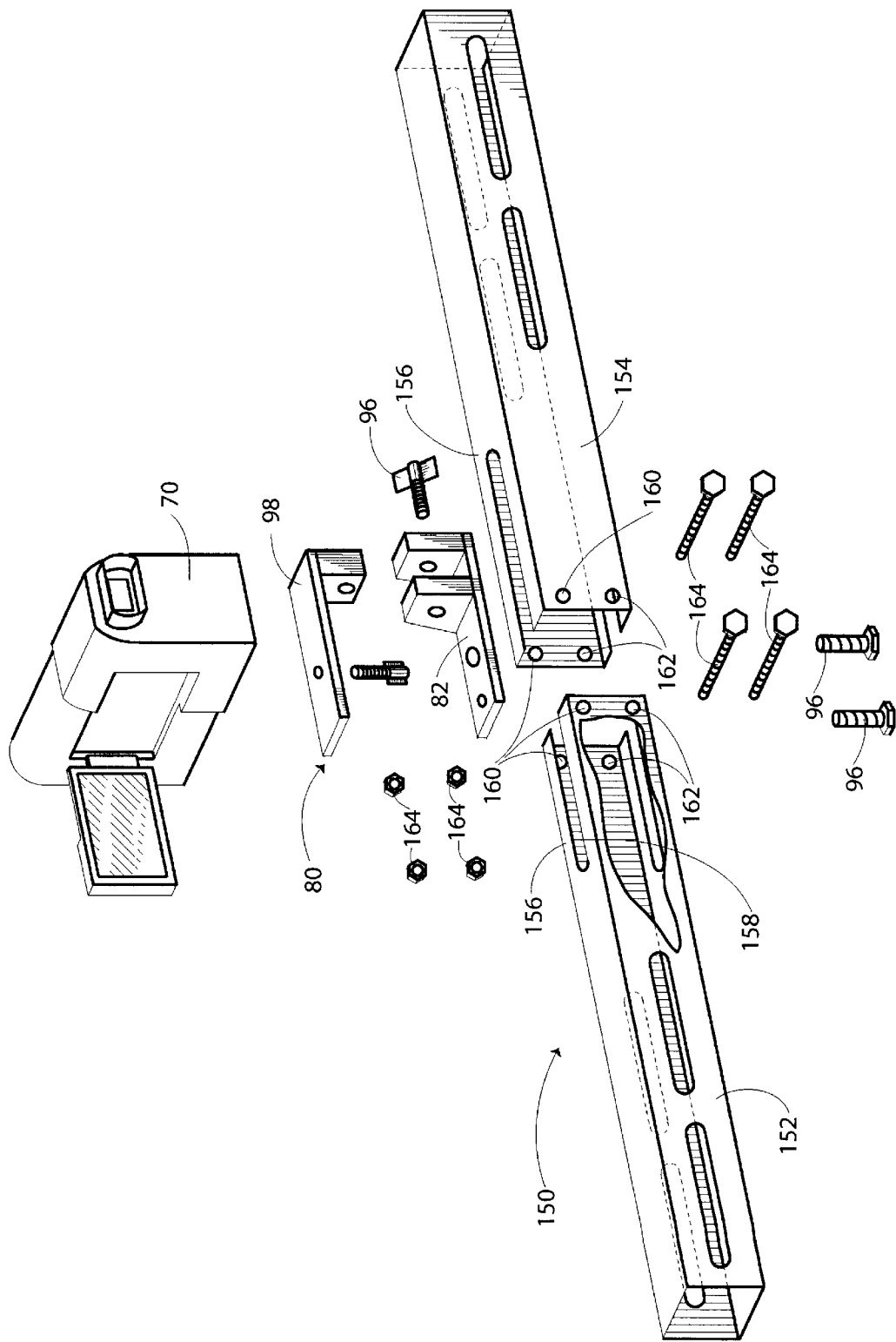
FIG. 3 is a perspective view of an alternate embodiment of the mount bar illustrated in FIG. 1 for attachment to the headrest support of a seat in a motor vehicle.

Referring now in more detail to the drawings in which like parts have like identifiers, FIG. 1 illustrates in perspective view a mount bar 10 attached to a seat 12 in an motor vehicle for supporting video recording and display devices according to the present invention. The seat 12 can be bench-style or spilt bucket-style as illustrated. In the illustrated embodiment, the mount bar 10 comprises an elongate tube 14 having a rectangular cross-section. The tube 14 has opposing sides 16, 18 and opposing upper and lower sides 20, 22. The side 16 bears against legs 24 for a headrest 26 that extend from a seatback 28 in a motor vehicle. In an alternate embodiment, the mount bar 10 is a rigid angle member that defines an L-shape in cross-sectional view. The angle member has substantially perpendicular surfaces that correspond to the side 16 and the upper side 20 for connecting this embodiment to the legs 24 of the headrest 26 and to video recording and display devices, as discussed below.

The mount bar 10 supports a video display frame, generally 30. The frame 30 includes a pair of opposing side members 32 and opposing top and bottom members 34, 35. The top member 34 defines a plurality of openings 36. Fasteners 38 extend through openings 40 in the mount bar 10, and engage connectors 42 for attaching the support 30 to the mount bar 10. A shelf 44 attaches at distal ends of the side members 32 and to the bottom member 35 that provides support for the shelf 44. A video display device 46 mounts to the shelf 44. The video display device 46 can be a video monitor, conventional television, an LCD display screen, or other such image display device. In the illustrated embodiment, the device 46 includes threaded bores 48 in a lower surface which receive fasteners 50 through aligned openings 52 in the shelf 44. In an alternate embodiment, straps (not illustrated) secure the device 46 to the shelf 44 and the support 30.

In the illustrated embodiment, a video recorder 52 is suspended from a lower surface of the shelf 44. In a first embodiment, the casing or housing for the video recorder 52 includes laterally extending flanges 53 with openings 51 for receiving threaded fasteners that connect the casing to the shelf, as best illustrated in the enlarged partial detailed view.

FIG. 1 also illustrates a second embodiment for suspending the video recorder. This embodiment has a brace 54 with a cross-section that conforms to the shape of the casing. Lateral distal ends 55 of the brace 54 define openings for receiving the fasteners to secure the video recorder 52 to the shelf 44. A pair of the braces may be required to support the recorder 52.

In the illustrated embodiments, a pair of opposing arms 60 extend latterly from the side members 32. Each arm 60 includes a plate 62 which bears against the seat back 28 in the illustrated embodiment, a pair of straps 64, 66 attach to the arms 62. The straps 64, 66 are preferably a strong woven fabric, such as a seat belt material. The straps 64, 66 terminate in mating the buckles 68, 70. A portion 72 of the strap 66 extends from the buckle 70 for tightening the strap when the buckle 68, 70 is connected. Preferably, the straps 64, 66 extend around a seat post that anchors the seat 28 to the floor of the motor vehicle.

With continued reference to FIG. 1, the upper side 20 of the tube 14 supports a video recording device such as a video camera 70. The sides 20, 22 each define opposing elongated slots 72 which are aligned to each other and parallel to a longitudinal axis of the tube 14. The slots 72 are preferably positioned central between the distal ends 74, 76 of the tube 14. The sides 20, 22 further define the opposing aligned openings 40 which are spaced apart from the distal ends of the slots 30. The openings 40 receive the threaded fasteners 38 that engage the connectors 42, for attaching the frame 30 to the tube 14, as discussed below.

The tube 14 receives a camera mount, generally designated 80. The camera mount 80 comprises a support block 82 having at least one tapped bore 84 which receives a bolt 86 extending through the slots 72 of the tube 14 to secure the support block to the tube. A pair of flanges 88, 90 extend upwardly at a side portion of the support block 82. The flanges 88, 90 have a trapezoid shape in end view, with the wider base of the trapezoid integral with the support block 82. The flanges 88, 90 define coaxially aligned bores 92, 94 with the bore 92 being threaded for receiving a threaded fastener 96. A pivot plate 98 includes a depending trapezoid-shaped flange 100 that defines a bore 102. The flange 100 is disposed laterally inward of an edge of the pivot plate 98, whereby the flange can be disposed between the pair of flanges 88, 90. The pivot plate 98 defines a hole 104 for receiving a threaded fastener 106 for engaging the camera 70 to the pivot plate with a bolt. The supporting block 82 and the pivot plate 98 are readily manufactured, such as by extrusion or molding with minimal machining required.

The sides 16, 18 define at least one pair of elongated slots 106. In the illustrated embodiment, the sides 16, 18 define two pairs of slots 106, 108 which are spaced apart and coaxially aligned and substantially parallel to the longitudinal axis of the tube 14. Brackets 110 secure the tube 14 to the legs or supports 24 of the headrest 26. The bracket 110 comprises a block having a first face 112 and a second face 114 which is recessed relative to the first face. A land 116 projects from the face and is sized to extend through the slots 106, 108 in the tube 14. The bracket 110 also defines a bore 116 for receiving and securing a threaded fastener 118 which extends through the respective slots 106, 108. The first face 112 accordingly provides a planer surface for abutting against the face 16 of the tube 14. The second face 114 abuts against a face of the headrest support 24.

FIG. 2 is a perspective view an alternate embodiment of of a camera mount bar 130 for attaching to the legs 24 of the headrest 26 extending from the seat back 28 of a seat in a motor vehicle. The camera mount 130 is preferably a tube having opposing sides 132, 134 and opposing top and bottom sides 136, 138. The sides 132, 134 define elongated slots 142, 144 which are coaxially aligned and substantially parallel to the longitudinal axis of the tube. Two opposing slots 146 are defined in upper and lower sides 136, 138 of the tube 130. Fasteners 96 extend through the slots 146 to rigidly connect the camera mount 80, discussed above, to the tube 140, for pivotally supporting a camera on the mount bar 130. The brackets 110 cooperate with the fasteners 118 to connect the tube 130 to the legs 24 of the headrest 26.

FIG. 3 is a perspective view of an alternate embodiment of the mount bar illustrated in FIG. 1 for attachment to legs 24 of the headrest 26 that extends from a seat in a motor vehicle. The camera mount bar 150 comprises a first elongated member 152 and a second elongated member 154 sized for mating engagement at first ends 156. Each of the members 152, 154 defines opposing aligned longitudinal slots 158. The slots 158 are open from the first ends 156 and extend substantially parallel to a longitudinal axis of the respective member 152, 154. The opposing side walls of the members 152, 154 further define a pair of opposing openings 160, 162 in a portion of the first ends 156. Bolts 164 extend through the aligned open 160 and 162 of the members 152, 154 and engage nuts in order to rigidly connect the members together. With the members 152, 154 engaged together, the slots 158 in the respective members are aligned. The opposing sides of the members 152, 154 further include the elongate slots 106, 108 for receiving the brackets 110 and fasteners 118 for securing the elongate member 150 to the legs 24 of the headrest 26 of a seatback 28. The camera mount 80 connects with fasteners 96 that extend through the slots 156 for selectively positioning the camera mount on the mount bar 150.

FIG. 4 is a perspective view of an alternate embodiment 170 of a mount bar of the present invention for attaching to the headrest supports 24 extending from a seat 28 in a motor vehicle. The mount bar 170 is an elongated member formed from a pair of side members 177 and a central member 174. In the illustrated embodiment, the side members 172 and the central member 174 are elongated open-ended tubes. However, the present invention is readily embodied in L-shaped angle members. The central member 174 has opposing distal ends which telescopically receive one of the pair of members 172. The central member 174 has an equipment support or mounting surface 176 that defines an elongated slot extending parallel to a longitudinal axis. The opposing surface in the tube also defines an opposing slot. A mounting surface 180 transverse to the support surface 176 defines a pair of longitudinal second slots 182, 184. The second slots 182, 184 are spaced apart and defined at respective distal ends of the central member 176. The opposing surface of the tube defines an opposing slot.

With reference to FIG. 1, the camera mount 80 discussed above connects with fasteners 96 that extend through the opposing slot 178 for selectively positioning the camera mount on the mount bar 170. As discussed above, the camera mount 80 pivotally connects the video camera 70 at a selected angle relative to the support surface, whereby the video apparatus can be selectively tilted for adjusting the angle of the view.

Returning to FIG. 4, the pair of side members 172 each define an elongated slot 186 in a side face 188. In the illustrated embodiment, the tubular side members define slots in the opposing face. The slot 186 aligns with a respective slot 182, 184 in the mounting surface 176 of the central member 174 upon telescopically sliding the side members 172 with the central member. The slots 186 receive the brackets 110 and fasteners 118 for securing the elongate member 170 to the legs 24 of the headrest 26 of a seatback 28. The 118 fasteners extend through the aligned slots 186, 182 and 186, 184, so that the side members 172 are also secured to the central member 174.

FIG. 5 is a perspective view of an alternate embodiment 190 of a mount bar of the present invention for attaching to the headrest support 24 of a seat 28 in a motor vehicle. The mount 190 has a pair of members 192 that are hingedly connected together by a connector 194. The connector 194 is generally U-shaped in cross-sectional view with an open side 196 for pivotal movement of the members 192. Each member 192 defines at least one elongated slot 198 in a side face for bearing against the headrest support 24 extending from the seat in a motor vehicle. The distal end of each member 192 also defines an opening 200 which receives a pivot pin 202. One of the members further has an equipment support or mounting surface 204 that defines an elongated slot 206 extending along a longitudinal axis.

The connector 194 receives the pair of spaced-apart pins 202. These extend through the respective openings in the end portions of the members 192. The members 192 pivot on the pins 202 from a first position with the members closely together and a second position with the members substantially coaxially aligned.

The slots 198 in the opposing sides of the members 192 receive the brackets 110 and the fasteners 118 for securing the elongate member 190 to the legs 24 of the headrest 26 of a seatback 28 (not illustrated). The camera mount 80 illustrated in FIG. 1 connects with fasteners 96 that extend through the slot 206 for selectively positioning the camera mount on the mount bar 190. The mount 80 pivotally connects the video camera 70 at a selected angle relative to the support surface 204, whereby the video apparatus can be selectively tilted for adjusting the angle of the view.

The operation and use of the camera mounts illustrated in FIGS. 1–5 are discussed below with reference to particular drawing figures. With reference to FIG. 1, the mount bar 10 and the video display frame 30 are used to support the video display device 46 in a motor vehicle. The connectors 110 and the fasteners 118 connect the mount bar 10 to the headrest supports 24. The video display device 46 connects with cabling (not illustrated) to a tape recorder. In the illustrated embodiment, the tape recorder 52 is suspended from the shelf 44 of the frame. The video camera mounts with the pivotable support 80 and fasteners 96 to the mount bar 10. The video camera 70 receives images which can be recorded on the recorder 52 and/or displayed on the video display device 46. It is to be appreciated that the frame 30 is likewise useful for supporting a video game apparatus as a substitute for the video recorder device, for playing electronic games during long trips.

The straps 64, 66 extend around a seat post to restrain the frame 30 from swaying during operation of the motor vehicle. The plates 62 likewise bear against the back of the seat 28, to restrain sway.

With reference to FIG. 2, the camera mount bar 130 provides a shorter length apparatus for supporting the video camera 70 laterally of the headrest 26. The bar 130 mounts to the supports 24 with the connectors 110 and fasteners 118. The video camera is selectively positioned along the slot 146, and connected with cables to a video display or recorder, for receiving, recording, and displaying images from the motor vehicle.

With reference to FIG. 3, the mount bar 150 is likewise readily stored and easily assembled for installation to the seats of a motor vehicle, as discussed above. The fasteners 164 secure the members 152, 154 rigidly together. Although not illustrated, the bar 150 readily receives the frame 30 discussed above, with the addition of openings 40 for the fasteners 38, 42.

With reference to FIG. 4, the mount bar 170 selectively attaches to the supports 24 by sliding the members 172 longitudinally in the connector member 174. The connectors 110 and fasteners 118 secure the members 172, 174 together and to the supports 24. The video camera 70 then connects with the mount 80 for selective angle of receiving images from the motor vehicle. Although not illustrated, the bar 150 readily receives the frame 30 discussed above, with the addition of openings 40 for the fasteners 38, 42.

With reference to FIG. 5, the mount bar 190 operates by pivoting the members 192 from the first position to the second position. The first position facilitates storage and handling of the elongate member. The members 192, being pivoted to the second position, define the elongated member 190 for connecting at opposing distal ends to the headrest supports 24 extending from the back of the seat in the motor vehicle. With the member 192 coaxially aligned, the mount 190 is connected with the brackets 110 and fasteners 118 to the headrest supports 24. The camera mount 80 is attached with the fasteners 96 and the video camera 70 is attached, for receiving images at a selected angle of view. The brackets 110 and the fasteners extend through the slots 198, for connecting to respective headrest columns 24 extending from the seatback of the motor vehicle in which the mount is installed. Although not illustrated, the bar 150 readily receives the frame 30 discussed above, with the addition of openings 40 for the fasteners 38, 42.

The principles, preferred embodiments, and modes of operation of the present invention have been described in the foregoing specification. The invention is not to be construed as limited to the particular forms disclosed because these are regarded as illustrative rather than restrictive. Moreover, variations and changes may be made by those skilled in the art without departure from the spirit of the invention as described by the claims.

What is claimed is:

1. A mount bar for use in an motor vehicle to support video equipment for recording images from the motor vehicle and for observing display of recorded images, comprising:
   an elongate member for being attached to a seatback of a motor vehicle and having a support surface;
   means for pivotally connecting an image receiving device to the elongate member at a selected angle, whereby the image receiving device can be selectively tilted for adjusting the angle of the view for receiving images;
   means for connecting opposing ends of the elongate member to respective seatbacks of the motor vehicle in which the mount bar is installed; and
   a frame for supporting an image display device, said frame detachably connected to the elongate member comprising:
   a pair of side supports adapted for attaching at respective first ends to the elongate member and depending therefrom;
   a shelf attached to respective second ends of the side supports for receiving the image display device;
   threaded fasteners that extend through openings in the support plate for engaging connectors in said image display device;
   a pair of opposing arms extending laterally from the pair of side supports for bearing against a back surface of a respective seat in a motor vehicle, for preventing sway of the frame during operation of the motor vehicle; and
   means for securing a distal end of the frame to the seat of the motor vehicle.

2. The mount as recited in claim 1, wherein connecting means comprises bolts extending through the arms and engaging threaded connectors for detachably engaging the frame for the image display device to the elongate member.

3. The mount bar as recited in claim 1, further comprising means for supporting a video recording device from the frame.

4. The mount as recited in claim 1, further comprising a pair of opposing plates that extend laterally from a lower end of the respective arms, whereby the plates bear against the back surface of the seatback for stopping the lower end of the monitor support from pivotable movement about the member.

5. The mount as recited in claim 1, wherein means for securing the frame comprises at least one strap attached at a first end to a lower end of the arm and being adapted at a second end for detachable engagement to a buckle attached to the arm, for extending around the seatback and engaging the buckle, whereby the frame for the image display device is secured to the seat of the motor vehicle.

6. The mount bar as recited in claim 1, wherein the means for securing the distal end of the frame comprises a belt having mating connectors for extending around a seat post of the seat in the motor vehicle; and
   means for adjusting the length of the belt, whereby the belt may be selectively cinched tightly for holding the frame in position relative to the seat back.

7. The mount bar as recited in claim 6, wherein means for supporting comprises a bracket conforming in cross-sectional shape to the image recording device with laterally extending flanges that define bores; and
   fasteners that extend through the bores into connectors attached to the shelf.

8. The mount bar as recited in claim 6, wherein means for supporting comprises a housing for the image recording device that includes laterally extending flanges which define bores; and
   fasteners that extend through the bores into connectors for attaching the housing to the shelf.

9. A camera mount for use in an motor vehicle in which each headrest has a pair of spaced-apart supports extending from a seatback, said camera mount to support a camera laterally of the headrest for recording images from the motor vehicle, comprising:
   an elongate member for being attached to a seatback of a motor vehicle, with a pair of longitudinally extending, spaced-apart first slots defined in a mounting surface, and having a camera support surface that defines an elongate, longitudinally extending second slot therein in a distal end portion;
   a pivot plate connected to the camera support surface by a pair of threaded fasteners extending through the second slot, whereby the pivot plate is selectively positioned on the distal end portion of the member;
   means for securing a camera to the pivot plate;
   means for locking the pivot plate at a selected angle relative to the camera support surface, whereby the camera can be selectively tilted for adjusting the angle of the camera view for recording images; and
   brackets defined by fasteners and connectors connecting the member to the supports of the headrest in the seatback of the motor vehicle in which the camera mount is installed, the fasteners for extending through the first slots to engage the connectors with the supports held therebetween.

10. The camera mount as recited in claim 9, wherein the elongate member is a tube, and wherein opposing sides of the tube each include aligned first slots and a tube surface opposing the camera support surface defines another second slot for receiving fasteners therethrough.

11. The camera mount as recited in claim 9, wherein each of the connectors in the brackets comprise a block having a notch for receiving a portion of a respective one of the headrest supports, with a bore therethrough for receiving the fastener,
   whereby the brackets secure the member to the headrest support.

12. A camera mount bar for use in an motor vehicle to support a camera for recording images from the motor vehicle, comprising:
   a first elongate member and a second elongate member being sized for mating engagement at respective first ends;
   means for rigidly connecting the first and the second elongated members at the first ends when matingly engaged;
   each of the first and the second elongated members having at least one longitudinal first slot in a side face thereof;
   mounting brackets extending through the first slot for connecting the elongated member to a headrest support in a seatback of a motor vehicle; and
   each of the first and the second elongated members having a camera support surface that defines a second slot extending longitudinally from the respective first ends towards the respective opposing distal ends, the second slots becoming coaxially aligned upon connection of the elongated members, for receiving a camera support bracket, whereby the camera is selectively positioned along the elongated members.

13. The camera mount bar as recited in claim 12, wherein means for rigidly connecting comprises:

the first and the second elongate members defining a pair of holes in a portion of the respective first ends of the members, the holes disposed for alignment upon mating engagement of the respective first ends of the first and the second elongate members; and fastening members extending through the aligned holes to secure the first and the second elongated members together.

14. The mount bar as recited in claim 1, wherein the elongate member is defined by at least a pair of members rigidly joined coaxially together.

15. The mount as recited in claim 14, wherein the pair of members comprises a first tube slidably received within a second tube to have overlapping end portions;

each of the first tube and the second tube defining a pair of spaced-apart openings in the overlapping end portions for receiving fasteners therethrough, whereby the first and second tubes are rigidly joined together by securing the fasteners.

16. The mount as recited in claim 15, wherein the first tube and the second tube each have opposing slots extending from the respective ends for the overlapping portions, said slots coaxially aligned for receiving therein fasteners for securing the video recording apparatus to the support surface, whereby a longitudinally extending slot is thereby defined in the elongate member for selectively positioning the pivotal support on the member.

17. A mount for use in an motor vehicle to support video equipment for recording images from the motor vehicle, comprising:

a pair of members hingedly connected together by a connector that is generally U-shaped in cross-sectional view, each member defining at least one elongated slot in a side face for bearing against a headrest support extending from a back of a seat in a motor vehicle and an opening in an end portion;

the U-shaped member having a pair of spaced-apart pins which extend through the respective opening in the end portion of the members, whereby the members pivot on the respective pins from a first position with the members closely together and a second position with the members substantially coaxially aligned;

one of the members further having an equipment support surface that defines an elongated slot extending along a longitudinal axis;

means for pivotally connecting a video apparatus to the support surface at a selected angle relative to the support surface, whereby the video apparatus can be selectively tilted for adjusting the angle of the view; and means for connecting the members to respective headrest columns extending from the seatback of the motor vehicle in which the mount is installed, whereby the members, being pivoted to the second position, define an elongated member for connecting at opposing distal ends to the headrest columns extending from the back of the seat in the motor vehicle.

18. A mount for use in an motor vehicle to support video equipment for recording images from the motor vehicle, comprising:

an elongated member comprising a pair of side members and a central member having opposing distal ends which telescopically receive a respective one of pair of members;

the central member having an equipment support surface that defines an elongated slot extending along a longitudinal axis and defining a pair of longitudinal slots in a mounting surface transverse to the support surface;

means for pivotally connecting a video apparatus to the support surface at a selected angle relative to the support surface, whereby the video apparatus can be selectively tilted for adjusting the angle of the view; each one of the pair of side members defining an elongated slot in a side face which slot aligns with a respective slot in the mounting surface of the central member upon telescopically sliding the side members with the central member; and means for connecting the side members to respective headrest columns extending from the seatback of the motor vehicle in which the mount is installed, by which the side members also are secured to the central member.

* * * * *